(No Model.) 3 Sheets—Sheet 1.

E. W. McGUIRE.
LAWN MOWER.

No. 554,081. Patented Feb. 4, 1896.

Witnesses:
Jas. E. Hutchinson
Henry C. Hazard

Inventor.
Elwood W. McGuire
by Prindle and Russell
his Attorneys (No Model.) 3 Sheets—Sheet 2.

E. W. McGUIRE.
LAWN MOWER.

No. 554,081. Patented Feb. 4, 1896.

Witnesses:
Jas. E. Hutchinson
Henry C. Hazard

Inventor.
Elwood W. McGuire
by Prindle & Russell
his attorneys (No Model.)  3 Sheets—Sheet 3.

E. W. McGUIRE.
LAWN MOWER.

No. 554,081. Patented Feb. 4, 1896.

Witnesses:
Jas. E. Hutchinson
Henry C. Hazard

Inventor.
Elwood W. McGuire
by Prindle and Russell
his Attorneys

UNITED STATES PATENT OFFICE.

ELWOOD W. McGUIRE, OF RICHMOND, INDIANA.

LAWN-MOWER.

SPECIFICATION forming part of Letters Patent No. 554,081, dated February 4, 1896.

Application filed April 22, 1890. Serial No. 349,030. (No model.)

*To all whom it may concern:*

Be it known that I, ELWOOD W. MCGUIRE, of Richmond, in the county of Wayne, and in the State of Indiana, have invented certain new and useful Improvements in Lawn-Mowers; and I do hereby declare that the following is a full, clear, and exact description thereof, reference being had to the accompanying drawings, in which—

Figure 1:
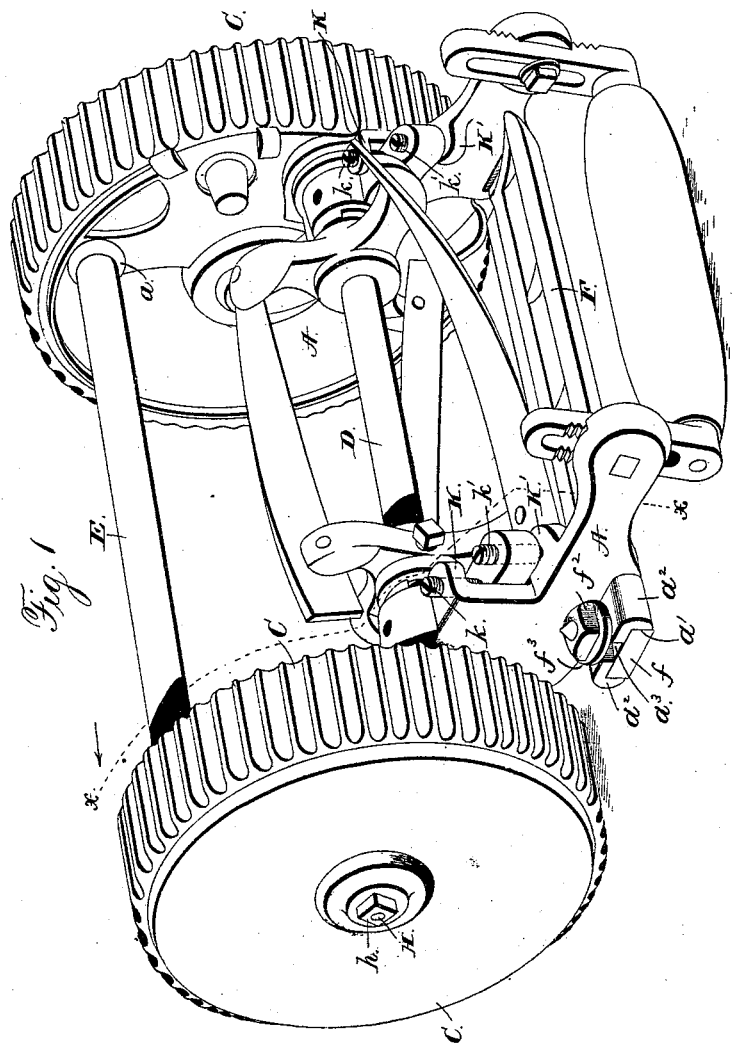
Figure 2:
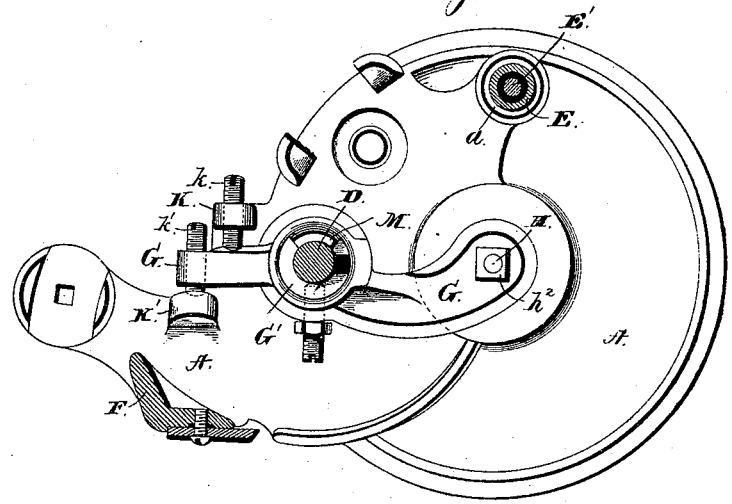
Figure 3:
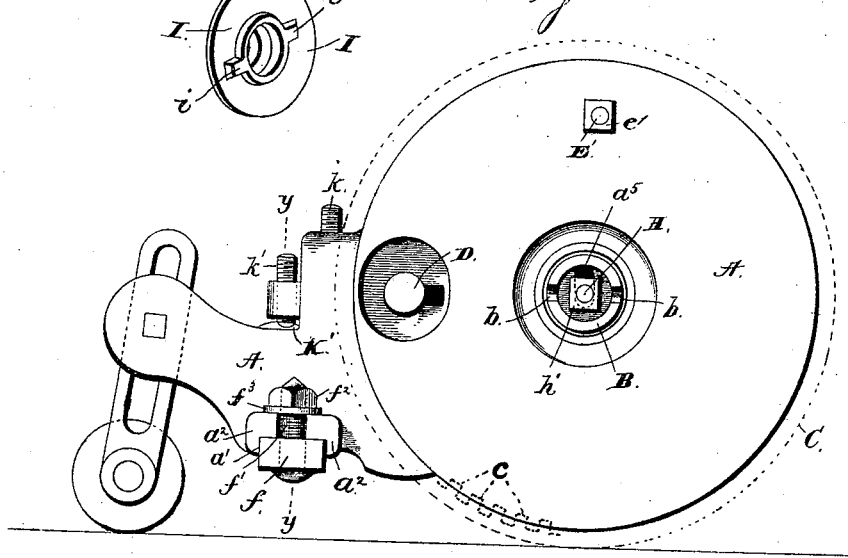
Figure 4:
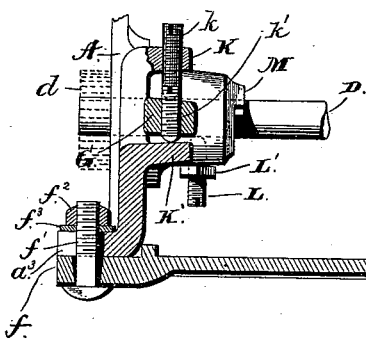
Figure 4:
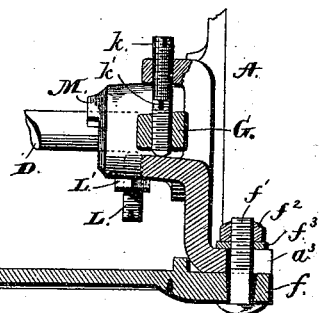
Figure 5:
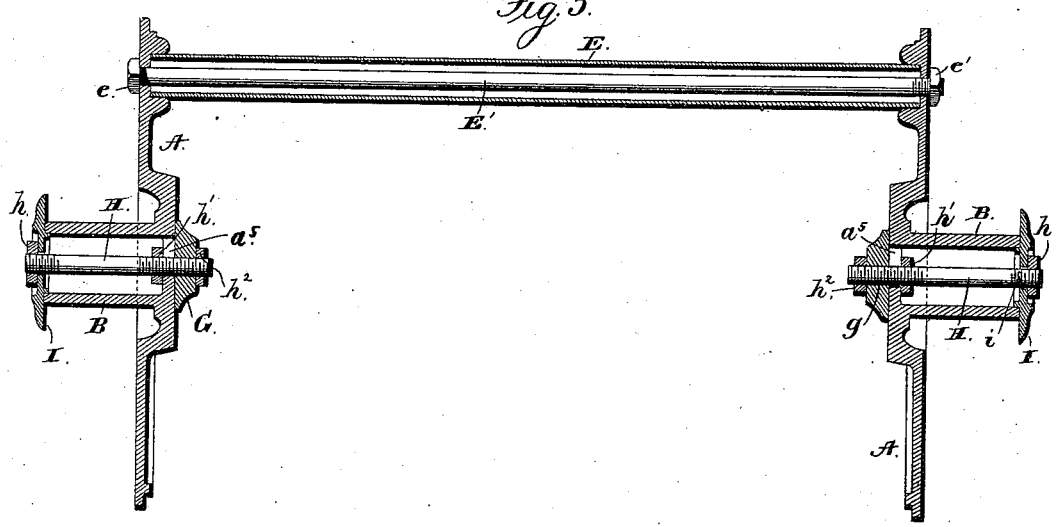
Figure 6:
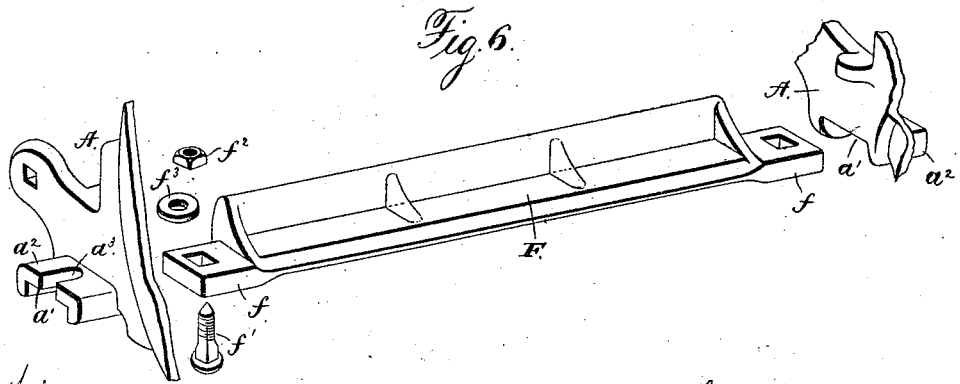

Figure 1 shows a perspective view of a lawn-mower made in accordance with my invention; Fig. 2, a view of a section of the same on line $x\,x$ of Fig. 1; Fig. 3, a view of the machine in end elevation with the driving-wheel on the end removed; Fig. 4, a view of a section on line $y\,y$ of Fig. 3; Fig. 5, a view of a longitudinal section of the frame-brace, and Fig. 6 a perspective view of the stationary knife-bar and the portions of the frame to which it is attached with the parts separated to show their shape.

Letters of like name and kind refer to like parts in each of the figures.

The object of my invention is to provide an improved lawn-mower; and to this end my invention consists in the mower and in the parts thereof constructed, arranged, and combined as hereinafter specified.

The special purpose of my invention has been to so construct and connect the various parts of the mower and its frame that the machine, while being light, shall be cheaper, more easily put together and adjusted and, when put together, more solid and firm than any of the lawn-mowing machines heretofore made and used.

In the drawings, A A designate the side frame-plates, which are provided on their outer sides with the hollow studs B B, forming bearings for the supporting-wheels C C, either one or both of which can be geared with or adapted to drive the rotary cutter-shaft D in the ordinary way.

For holding the plates A A in proper relative position I provide the tubular brace E extending from one plate to the other and having its opposite ends resting against the plates and surrounded by annular ribs or flanges $a\,a$ on the latter. These annular flanges form sockets on the plates to receive the brace ends. If desired, they can be dispensed with and the brace-receiving recesses can be made in the body of the plates without departure from my invention. I prefer, however, the construction shown, as the plates can then be made light and thin and need not be cut into, and the ribs or flanges do not add any perceptible amount to the weight of the machine.

Extending through the frame-plates and the brace E is the rod E' which, having the head $e$ on one end, has its other end threaded and provided with a nut $e'$ to engage the outer side of the frame-plate, as shown. By means of this bolt-rod, with its head and nut in engagement with the outer sides of the respective frame-plates, the latter can be drawn toward each other, so that the ends of the brace E will be seated firmly against them in the brace-receiving sockets or recesses.

The stationary knife-bar F, situated well to the rear of the studs which form the bearings upon which the supporting-wheels are journaled, as shown in the drawings, is also used to connect and hold the frame-plates in place. On its opposite ends it has the projecting portions $f\,f$, preferably squared or angular in cross-section, engaging and fitting grooves $a'\,a'$ in the plates and in outwardly-extending lugs $a^2\,a^2$ on the latter. Each lug is slotted, as shown at $a^3$, to admit the passage of the bolt $f'$, which, extending up through the portion $f$ on the knife-bar and the slot $a^3$, has on its upper end a nut $f^2$ engaging a washer $f^3$ resting upon the top of the slotted lug. With this construction the frame-plates can, upon being brought against the abutting ends of the bar F, be securely fastened there by the tightening up of the nuts on the bolts $f'\,f'$. On the knife-bar connected with the side plates, as described, and the tubular brace with its headed bolt-rod and nut the plates can be held most firmly and securely in their proper relative positions for the support of the working parts of the machine.

Pivotally supported from the plates A A at points in line with the axes of the respective supporting or drive wheels are the two rearwardly-extending arms G G, each carrying a journal box or bearing G' for one end of the rotary cutter-shaft D. The arms are thus pivoted to the plates in order that their swing may be concentric with the drive-wheels, and the shaft ends may always have the same relative position with reference to the circumference of the respective wheels or to the concentric series of gear-teeth $c\ c$ on the latter. A pinion $d$ on the shaft end can then be kept in engagement with the teeth on a drive-wheel as the shaft is raised or lowered by swinging of the bearing-arms G G up or down. For the pivotal support of these arms I make use of the same bolts H H which serve to hold in place on the outer ends of the wheel-bearing studs B B the plates I I for retaining the wheels C C on the studs. These latter plates are of the ordinary construction, having one or more ribs or lugs $i\ i$ on their inner sides to engage notches $b\ b$ in the ends of the tubular studs, so that the plates will not be caused to rotate by contact with the wheels or the hubs thereof. Each bolt H, extending through a stud B and openings $a^5$ and $g$ in a frame-plate A and arm G, respectively, is threaded and provided with three nuts $h$, $h'$, and $h^2$, the first engaging the outer side of the wheel-retaining plate I, the second the outer side of the frame-plate A, and the third the inner side of the arm G. With this construction, the nut $h'$ being in contact with the outer side of the frame-plate, the arm G can be held on the bolt and clamped up against said plate, as desired, by screwing up the nut $h^2$, and with the latter nut engaging the arm the wheel-retaining plate I can be forced and held in place on the outer end of the respective stud B by screwing up nut $h$.

The nuts $h'\ h'$ form in effect collars on the bolts H H to engage the frame-plates. Instead of being movable on the bolts they can be fixed so as to form stationary collars, without departure from my invention.

The openings $a^5$, through which bolts H pass, can be made, as indicated in the drawings, elongated up and down, so as to allow of a certain amount of adjustment of the inner end of the bolt, and a consequent slight raising or lowering of the pivotal portions of the arms G G.

On the inner side of each frame-plate A are the two lugs K K', one above and the other below a portion of the respective arm G beyond the shaft bearing in the latter. In the upper of these lugs is a set-screw $k$, engaging the upper side of the arm, while a second set-screw, $k'$, on the arm itself engages the lower lug K'. With this construction, obviously, the position of the arm, and so of the shaft-bearing and shaft, can be adjusted by turning the screws in opposite directions. For instance, by screwing screw $k$ down and the other one up or screw $k'$ down and the other, $k$, up the shaft-bearing arm will be adjusted lower or higher. I prefer to make the surface on the arm which is engaged by set-screw $k$ and that on the lug K', engaged by set-screw $k'$, inclined slightly downward and inward and downward and outward respectively, as shown in the drawings. Such arrangement causes, as the set-screws are screwed home to bear with pressure upon the inclined surfaces, a forcing of the arm G toward the respective frame-plate A.

While the rotary cutter-shaft bearings on the arms G G can be of the divided journal-box form, I prefer to make them in one piece, as shown in the drawings, and for adjustment of the shaft in them. I provide on their under sides the screws L L, having their upper ends adapted to engage the shaft and the lock or jam nuts L' L' for locking such screws as turned.

Attached to and extending inward from the shaft-bearings are the clearers M M, which, as fully set forth in the joint United States application, Serial No. 264,554, filed February 20, 1888, by H. H. Dille and myself, upon which Letters Patent No. 446,329 were issued February 10, 1891, act to keep grass and dirt from collecting on the shaft in contact with the bearings of the latter.

From the drawings it will be seen that the shaft-bearings on the arms G G are situated above the stationary knife-bar in position to bring the cutter-shaft just forward of a plane through the knife edge. With this arrangement as the arms are adjusted up or down the angle of the rotary blades with reference to the stationary knife will not be substantially changed.

With the arms pivoted well forward of the knife-bar and extending rearward above the same from their pivotal points, and the rotary cutter journaled on such arms so that its axis is forward of a vertical plane through the cutting-edge on the bar, it will be seen that, considering these parts alone and without reference to any action of the driving-gear, any resistance offered by the material being cut will tend to cause a drawing down of the cutter-shaft supporting-arms, and thus a tendency of the operating-blade of the rotary cutter toward the cutting-edge of the stationary knife and not away therefrom. As, however, the rotation of the cutter-shaft is resisted by any impediment to the rotary cutter, the engagement of the teeth of the shaft-pinion and the driving-wheel will tend to lift the arms G G; but such lifting will be without detriment, since the location of the shaft and the pivots of said arms relative to the fixed knife is such that the acting cutter-blade will be moved rearward past said knife edge and forcibly cut any opposing material.

With the parts of the mower arranged and constructed as shown and described when the machine is to be assembled the tubular brace is placed between the frame-plates A A, and the headed bolt-rod E', having been passed through the plates and brace, the nut $e$ is tightened up. The stationary knife-bar F is also placed with its projections $f\ f$ in the grooves or recesses $a'\ a'$ in the slotted lugs $a^2\ a^2$, where they are fastened, as described, by bolts $f'$, nuts $f^2$ and washer $f^3$. The ends of the rotary cutter-shaft are inserted in the bearings on the arms G G when the latter have been arranged in position on the inner sides of the side plates A A, and said arms are fastened to said plates A A by the bolts H H and nuts $h'$ $h^2$ thereon, and the set-screws $k$ and $k'$ are turned to give the proper adjustment of the arms with reference to the lugs K K, so as to adjust the rotary cutter to its proper position with reference to the stationary cutter on bar F. The drive-wheels C C can then be secured upon their bearing-studs B B by the plates I I, forced and held in position by the nuts $h$ $h$ on bolts H H. With the usual roller or wheels to support the rear ends of the frame-plates A A and the handle attached the machine will be ready for use.

When from wear of the rotary and stationary cutters it becomes necessary to adjust them with reference to each other, the arms G G are lowered by the screwing down and up of set-screws $k$ and $k'$, respectively. These screws bearing against the oppositely-inclined faces on the upper sides of the arms and lower lugs on the frame-plates hold the arms securely in place on the inner sides of such plates. The stationary cutter being on bar F, attached to the frame-plates A A, is not moved, but remains fixed at the same height with reference to the plates and the ground over which the driving and supporting wheels travel.

My machine, constructed and put together as shown and described, is, while cheap, simple, most firm and rigid, capable of being quickly assembled or taken apart and has provision for ready adjustment of its parts.

Having thus described my invention, what I claim is—

1. In a lawn-mower, in combination with the frame and the stationary cutter thereon, the rotary cutter, swinging arms on the frame supporting the rotary cutter-shaft, and two set-screws for each arm, the one on the frame and the other on the arm engaging oppositely by inclined surfaces respectively on the arm and frame, substantially as and for the purpose described.

2. In a lawn-mower, in combination with the frame and the stationary cutter thereon, the rotary cutter, swinging arms on the frame supporting bearings for the rotary cutter-shaft, a set-screw on the frame for each arm engaging an inwardly and downwardly inclined surface on the upper side of the arm, and a set-screw on each arm engaging an outwardly and downwardly inclined surface on the frame, substantially as and for the purpose specified.

3. In a lawn-mower, in combination with the frame having the drive or supporting wheel receiving bearing, the plate for retaining the wheel therein, a swinging arm, the bolt passing through the frame, the wheel-bearing, the wheel-retaining plate and the swinging arm, nuts on opposite ends of the bolt engaging opposite faces of the arm and wheel-retaining plate, respectively, and means on the bolt for engaging the side of the frame opposite to that against which the inner side of the arm rests, substantially as and for the purpose specified.

4. In a lawn-mower, in combination with the frame having bearing-studs for the driving or supporting wheels, plates for retaining the wheels on the studs, swinging arms to be pivoted to the frame-bolts, passing through the sides of the frame, the studs, the arms and the wheel-retaining plates, and three nuts on the bolt engaging respectively the outer sides of the plates, the inner sides of the swinging arms, and the outer sides of the frame sides, substantially as and for the purpose shown.

In testimony that I claim the foregoing I have hereunto set my hand this 13th day of March, 1890.

ELWOOD W. McGUIRE.

Witnesses:
 ELIZABETH JONES,
 CHARLES H. KRIVEL.